United States Patent
Hofstee et al.

(10) Patent No.: US 7,146,371 B2
(45) Date of Patent: Dec. 5, 2006

(54) PERFORMANCE AND MEMORY BANDWIDTH UTILIZATION FOR TREE SEARCHES USING TREE FRAGMENTATION

(75) Inventors: Peter Hofstee, Austin, TX (US); Marc C. Necker, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 10/313,683

(22) Filed: Dec. 5, 2002

(65) Prior Publication Data

US 2004/0111420 A1 Jun. 10, 2004

(51) Int. Cl.
*G06F 17/00* (2006.01)
*G06F 7/00* (2006.01)

(52) U.S. Cl. .................. 707/100; 707/101; 707/102

(58) Field of Classification Search ............. 707/1–3, 707/7, 8, 10, 100–104.1, 202–203, 170, 206; 709/201, 238, 236; 711/137, 146, 170, 206
See application file for complete search history.

(56) References Cited

U.S. PATENT DOCUMENTS

| | | | | |
|---|---|---|---|---|
| 4,468,728 | A | * | 8/1984 | Wang .................. 707/1 |
| 4,599,691 | A | | 7/1986 | Sakaki et al. |
| 5,202,986 | A | | 4/1993 | Nickel |
| 5,371,885 | A | | 12/1994 | Letwin |
| 5,390,307 | A | | 2/1995 | Yoshida |
| 5,465,352 | A | * | 11/1995 | Nakazawa et al. ........ 707/3 |
| 5,546,390 | A | * | 8/1996 | Stone ................... 370/408 |
| 5,587,930 | A | | 12/1996 | Hori et al. |
| 5,664,184 | A | | 9/1997 | Ferguson et al. |
| 5,710,916 | A | | 1/1998 | Barbará et al. |
| 5,752,243 | A | | 5/1998 | Reiter et al. |
| 5,829,004 | A | | 10/1998 | Au |
| 5,892,513 | A | | 4/1999 | Fay |
| 6,067,574 | A | * | 5/2000 | Tzeng .................. 709/247 |
| 6,233,656 | B1 | | 5/2001 | Jones et al. |
| 6,246,347 | B1 | | 6/2001 | Bakhmutsky |

(Continued)

FOREIGN PATENT DOCUMENTS

CN 1316696 A 10/2001

(Continued)

OTHER PUBLICATIONS

Marcel Waldvogel et al.:"Scalable High Speed IP Routing Lookups", 1997, ACM, pp. 25-36.*

(Continued)

*Primary Examiner*—Jeffrey Gaffin
*Assistant Examiner*—Jacques Veillard
(74) *Attorney, Agent, or Firm*—Carr LLP; Diana R. Gerhardt

(57) ABSTRACT

A data structure and corresponding search methods are disclosed for improving the performance of table lookups. A data structure for the table is employed using a single hash table with hash table entries pointing to tree fragments that are contiguous in main memory and can be efficiently loaded into a local data store or cache. Decision nodes are stored in a contiguous block of memory in a relative position based on the position of the decision node in the tree structure, including blank positions. Leaf nodes are stored in a contiguous block of memory based on the position of the leaf node in the tree structure, concatenating leaf nodes to eliminate blank positions. Leaf nodes of the tree fragments contain indicia of a data record, or indicia of another tree fragment. The data structure and corresponding search algorithm are employed for searches based on a longest prefix match in an internet routing table.

17 Claims, 6 Drawing Sheets

U.S. PATENT DOCUMENTS 6,292,795 B1 * 9/2001 Peters et al. .................... 707/3
6,396,842 B1 * 5/2002 Rochberger ................. 370/408
6,675,163 B1 1/2004 Bass et al.
6,687,815 B1 * 2/2004 Dwyer et al. .................. 713/1

FOREIGN PATENT DOCUMENTS

| JP | 10091797 A | 4/1998 |
|---|---|---|
| JP | 2001099921 A | 4/2001 |

OTHER PUBLICATIONS

Sklower, K.; Abstract; "A Tree-Based Packet Routing Table for Berkeley Unix"; Computer System Research Group, EECS Dept., Computer Science Division, University of Calif., Berkeley, CA 94720.

Natarajan, K.S. et al.; "Predictive Method of Controlling Artificial Intelligence Search by Exploration and Ordering"; *IBM Technical Disclosure Bulletin*; Dec. 1989; vol. 32, No. 7; IBM Corp.

* cited by examiner

PERFORMANCE AND MEMORY BANDWIDTH UTILIZATION FOR TREE SEARCHES USING TREE FRAGMENTATION

TECHNICAL FIELD

This invention relates generally to memory tree searches and, more particularly, to employing hash table entries and their associated tree fragments.

BACKGROUND

In modern microprocessor systems, the speed of the main memory tends to be substantially slower than the speed of the processor core. A typical DRAM main store coupled to a high-frequency microprocessor takes several hundred processor cycles to access. In the future, problems resulting from the mismatching of memory speed versus processor speed will, in all likelihood, become ever more acute.

One major cause of these problems is memory access latency. For example, the time between the issue of a LOAD instruction to main memory and the actual transfer of a first Word from a main memory is usually very long, and can impose many stall cycles on the processor core. However, once the first word has been transmitted, consecutive words can be transferred quickly. The quick transference of consecutive words is generally referred to as the "burst-mode effect."

Typically, a microprocessor system employs a local store, such as a cache, to take advantage of the burst-mode effect. This occurs by transferring a whole cache line (that is, the minimum number of bytes that is to be loaded when a local store or cache data is replaced) from main memory and storing the whole cache line in the local store, instead of just transferring the smaller words that are requested directly from the main memory.

If the likely data to be read in the near future has a sufficient amount of spatial locality (that is, data stored in a sufficiently substantially contiguous area in the main memory) with the data now requested, and is therefore also stored in the local store, memory efficiency is improved. This is typically because the memory information that is likely to be needed is already stored in the faster cache, thereby reducing memory access times. The same effect can be achieved if the microprocessor system features a memory architecture, whereby the microprocessor system transfers the memory blocks from the main memory to a local store. The local store is comparable to a cache, such as a software-managed cache. The local storage can be a function of memory burst access size, bus transfer size and cache line size.

In conventional technology, methods exist to implement tree searches within a cache, by the cache hardware or software managed. During a search of a decision tree, such as a binary tree, after reaching a decision node, a subset of the appropriate tree nodes are accessed as the tree is traversed. This process continues until reaching the appropriate leaf node which contains the desired data. Only a few bytes are read during each tree node access.

Conventional tree search implementations use indirect pointers in each tree node to reference the parent and child nodes, and tree nodes are usually distributed across the whole address space. These approaches have at least two major drawbacks.

The first drawback of existing tree search implementations is that since the nodes, both decision and leaf, are typically distributed across the whole address space, multiple memory accesses to random memory locations need to be performed. Spatial locality is low or nonexistent, which leads to long waiting times for the microprocessor to wait upon memory access because the needed information is stored in noncontiguous areas. The second disadvantage is that the indirect pointers within a tree node consume memory.

Therefore, there is a need for employing tree nodes with memory accessing in a cache that overcomes the shortcomings of existing memory accessing methods.

SUMMARY

The present invention employs tree fragmentation in combination with a single hash table lookup scheme. A plurality of tree fragments is determined from a data tree structure. Each member of the determined plurality of tree fragments has at least one decision node and one leaf node. Each tree fragment is stored in its own contiguous memory segment. Decision nodes are stored in a contiguous block of memory in a relative position based on the position of the decision node in the tree structure, including blank positions. Leaf nodes are stored in a contiguous block of memory based on the position of the leaf node in the tree structure, concatenating leaf nodes to eliminate blank positions. At least one table entry corresponding to each tree fragment is hashed, thereby creating at least one hash key and at least one hash table entry. In one aspect, the data structure is most advantageously employed to implement a prefix search algorithm.

BRIEF DESCRIPTION OF THE DRAWINGS

For a more complete understanding of the present invention, and the advantages thereof, reference is now made to the following Detailed Description, taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise. In a further embodiment, the computer program is embodied upon or within a computer program product, such as a floppy disk or compact disk, or other storage medium.

Figure 1:
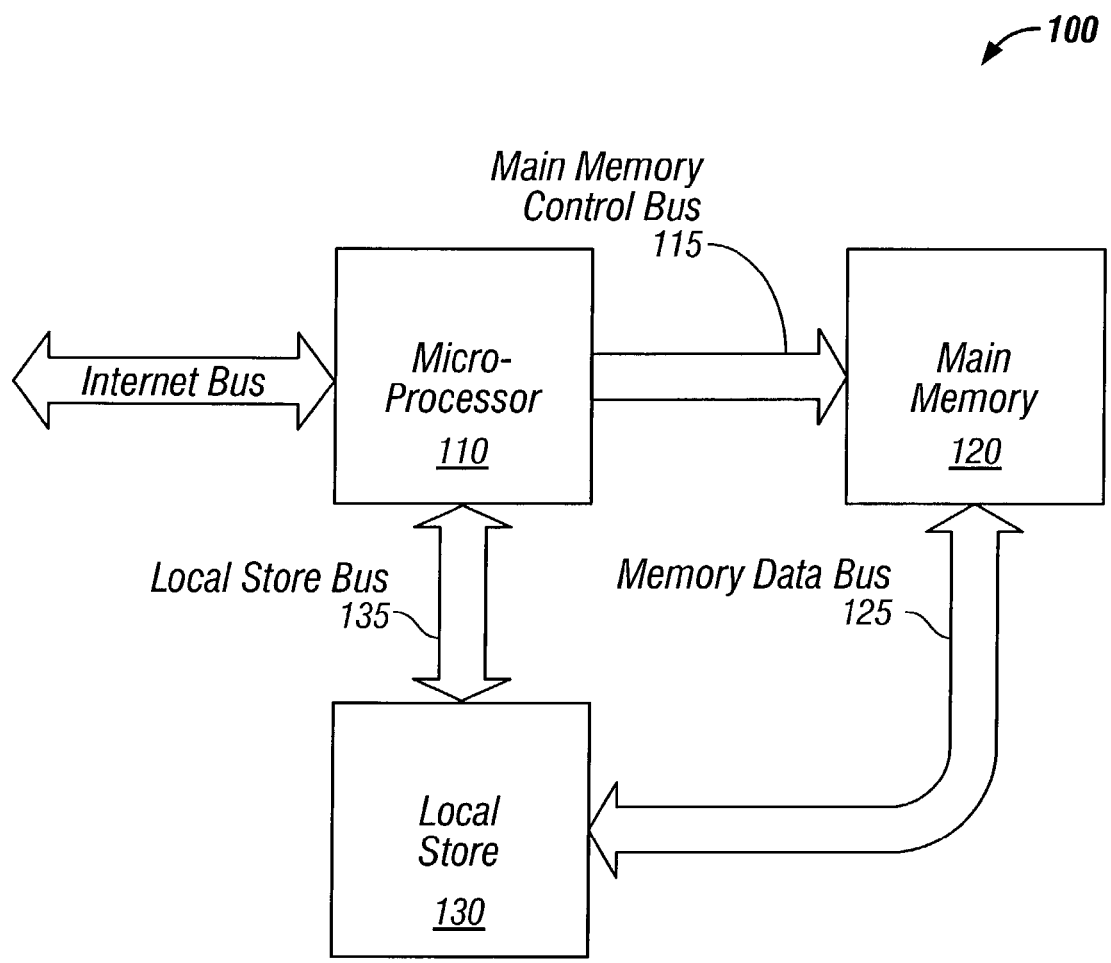
FIG. 1 illustrates a microprocessing system for employment of sub-tree fragments comprising a microprocessor, a main memory, a main memory bus, and a local store.

Referring to FIG. 1, illustrated is an exemplary microprocessing system 100. The system 100 comprises a microprocessor 110, a main memory control bus 115, a main memory 120, a memory data bus 125, a local store 130, and a local store bus 135. Typically, the microprocessor is further functionally coupled to an Internet bus, which is coupled to the Internet or some other networked environment.

Figure 2:
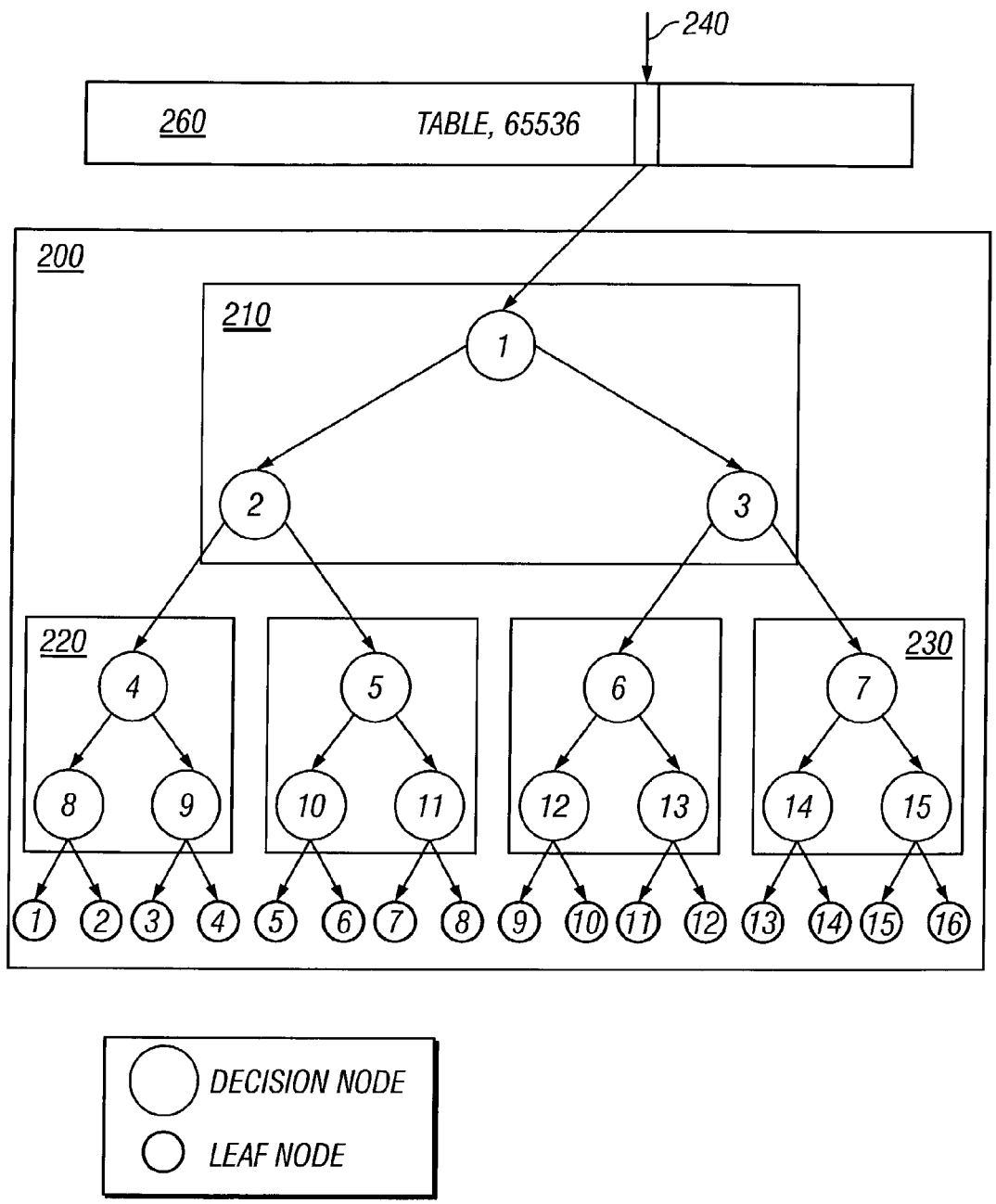
FIG. 2 illustrates a fragmentation of a binary tree.

Generally, in the system 100, search trees, such as binary search trees, are stored within the main memory 120. The search tree has been divided into tree fragments, as illustrated in FIG. 2. Each of these tree fragments represents a subset of a search tree, and is a tree itself. Referring back to FIG. 1, all the nodes, both decision nodes and leaf nodes, that belong to a sub-tree fragment are typically stored in the main memory 120 in consecutive memory locations (that is, in two separate blocks). In one embodiment, all tree fragments are equal in size.

In the system 100, a tree fragment is loaded into the local store 130, through the memory data bus 125, through the employment of one burst memory access step. The size of a sub-tree fragment to be loaded through the memory data bus 125 is subject to the minimum-size constraints of memory access granularity. Memory access granularity is generally defined as the minimum amount of data transferred from main memory in one load in a parallel data bit transmittal.

In one embodiment, the size of the fragment (that is, the total number of nodes) is as large as allowable by a function of the memory access granularity and size of a decision node. Typically, a quantity of $2^{n-1}$ nodes yields a balanced partitioning of a balanced binary tree. In general, the maximum allowable number of nodes can be calculated by the following formula:

Number of nodes=((Memory Access Granularity)–(Size of Fragment Header))/(Size of a Node)   1.

The microprocessor 110 determines in which sub-tree fragment the desired information is likely to be located through employment of hash function, hash key and hash table entries. In one embodiment, the hash table is a 1:1 hash table. In other words, there is a unique 1:1 correspondence between an entry in the hash table and the resulting value. The microprocessor 110 then requests, through the main memory control bus 115, information from the main memory 120 and loads the appropriate sub-tree fragment into the local store 130 in one load sequence. After being loaded into local store 130, the sub-tree fragment is traversed (searched) by the microprocessor 110. In a further embodiment, the local store 130 has a plurality of desired leaf nodes stored within it, as the loaded sub-tree fragment has a high degree of spatial locality. Therefore, a line in the local store 130 is accessed multiple times for one tree search, thereby saving substantial time when the microprocessor 110 accesses memory values. If the local store is organized as a cache, memory accesses associated with searching the tree fragment result in "cache hits;" that is, the hardware detects that the requested memory word is present in the cache. In the case of a "software managed" cache, this knowledge is part of the compiled program.

In a further embodiment, the microprocessor system 100 comprises a memory hierarchy with different levels of access granularity for each level of the memory hierarchy. For example, a processor reads single words from the local store 130, but the local store 130 can load only whole cache lines from a second cache. The second cache then accesses the main memory 120, or a third cache, with an even larger granularity.

Turning now to FIG. 2, illustrated is an example of a fragmentation of a binary tree 200. The pointer 240 in the table 260 points to the root node of the binary tree 200, which comprises, among others, the tree fragments 210, 220 and 230.

The illustrated embodiment of the binary tree 200 is employable for finding a longest prefix or LPM (longest prefix match). One context in which LPM arises is in utilizing a routing table lookup in Internet protocol (IP) forwarding. Typically, in IP forwarding, a routing decision is made based upon the destination address of an IP packet. Typically, the LPM is employed to find the longest bit pattern of length n within a table that matches the first n bits of the destination address. In this embodiment, the binary tree is a Patricia tree, which allows for an efficient LPM, although other tree types are within the scope of the present invention. The Patricia tree is combined with a table lookup. There is one table with 65536 entries, with one entry in the table matching the first 16-Bit of a 32-Bit IPv4 IP-Address.

An entry of this lookup table might contain one of the following three: 1) a pointer to a Patricia tree, that is, fragmented similar to the binary tree 200; 2) a pointer to the route information itself (in this case the longest prefix is exactly 16-Bit long); and 3) nothing. In the third case, the longest prefix for the considered IP-Address might be shorter than 16-Bit, which will make it necessary to search another Patricia tree which contains prefixes shorter than 16-Bit. This Patricia tree can be fragmented as well.

In FIG. 2, a table with 65536 entries, corresponding to the first 16-Bit of an IP-Address is illustrated. Such a table is the most simple form of a hash table with a 1:1 mapping. Those skilled in the art will understand that there are other hash tables that are employable within the scope of the present invention.

Generally, one important attribute of a tree fragment of the present invention is that all of its nodes are stored in main memory at consecutive memory locations; that is, the tree fragment is stored as a block. In this example, a tree fragment format as described in the following paragraphs will be used. Those of skill in the art will understand that the fragment format might be arbitrary, and that the only condition for successfully fragmenting a tree is that tree fragments are stored in blocks.

Figure 3A:
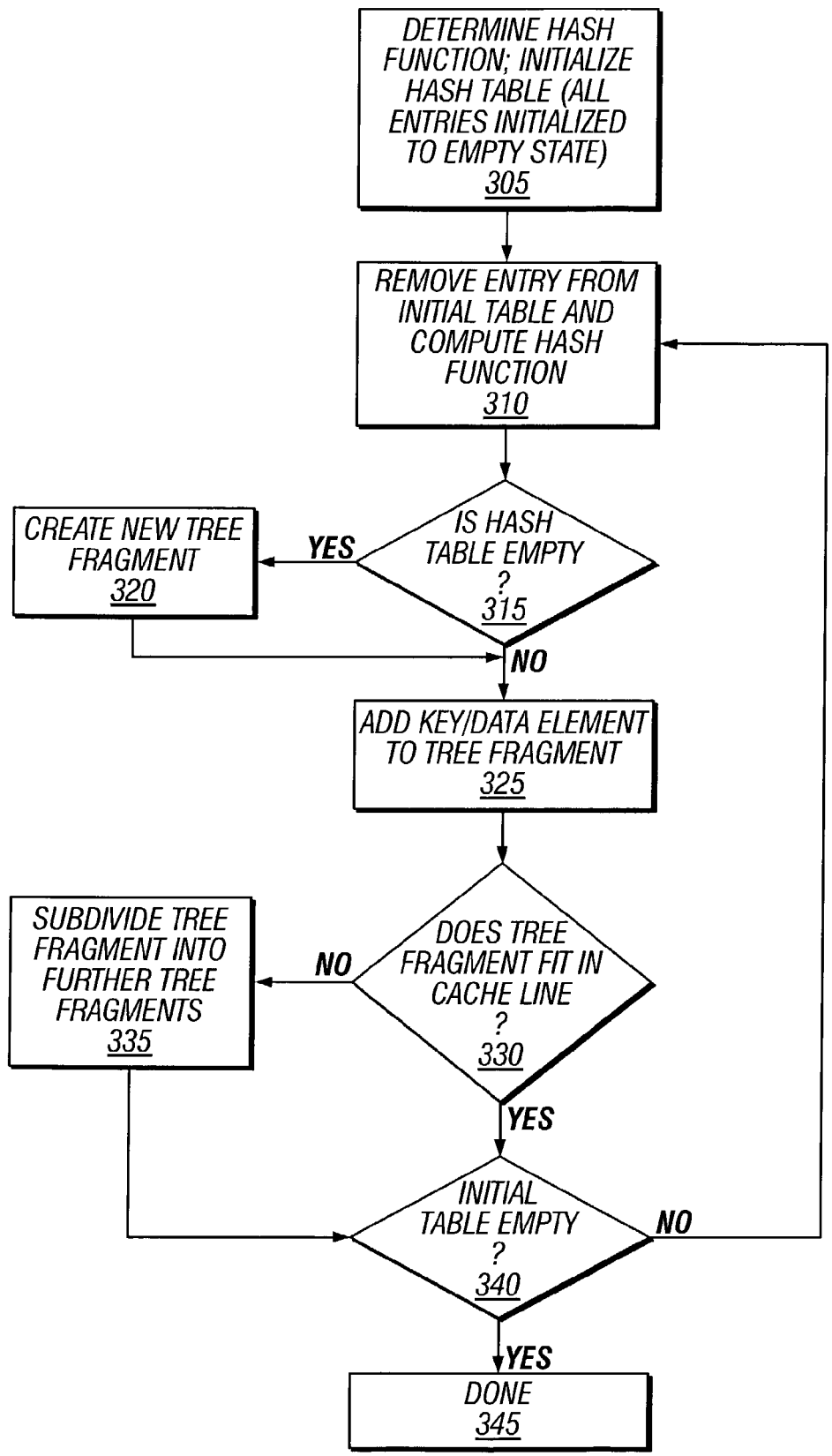
FIG. 3A illustrates a method for initializing a data structure employing tree fragments.
Figure 3B:
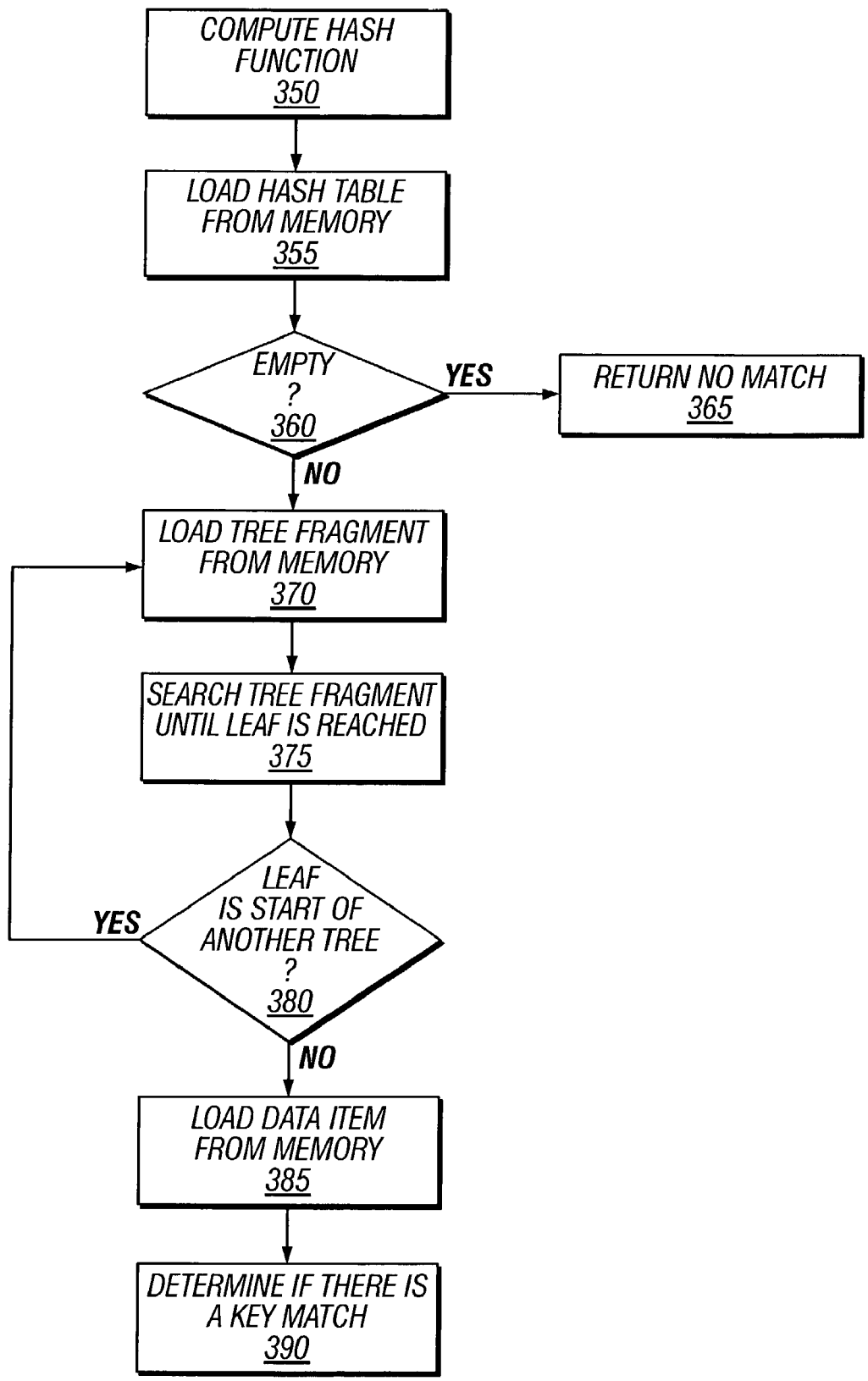
FIG. 3B illustrates a method for performing a search with the data structure employing tree fragments.

Turning now to FIGS. 3A and 3B, disclosed is a method 300 for initializing a data structure employing a sub-tree fragment given an initial table (FIG. 3A) and a corresponding search algorithm (FIG. 3B).

Turning first to FIG. 3A, the data structure is initialized as follows. In step 305, an appropriate hash function is determined and a corresponding hash table is initialized to the empty state. In step 310, an entry is removed from the input search data table and added to the new data structure by first computing the hash key. In step 315, the hash table entry is examined. If the hash table entry is empty, it is updated to point to a new (sub-tree) block in memory, in step 320. If the hash table entry is not empty, the element is added to the corresponding tree fragment in step 325. In step 330, the tree fragment is examined for size using the formula:

Fragment Size=((Memory Access Granularity)−(Fragment Header Size))/(Node Size).

If the tree fragment exceeds the size of the memory access granularity, the tree fragment is further fragmented into smaller tree fragments, in step 335. In step 340, the initial data structure is reexamined. If it is empty, initialization is complete. If it is not empty, the algorithm returns to step 310. In step 345, the method finishes.

Turning next to FIG. 3B, the corresponding search algorithm follows the following steps. In step 350, the search key is hashed to determine the index into the hash table. In step 355, the corresponding entry in the hash table is loaded from memory. Generally, this will require an access to main memory. In step 360, the hash table entry is examined. If the entry is empty, the search is indicated to be unsuccessful, in step 365. In a further embodiment, a backup data structure can be searched, if available. If the entry is valid, the indicated block is loaded in step 370. Generally, this will require a second access to main memory.

In step 375, the block is examined. If it is a tree fragment, such as a Patricia tree, it is searched until a leaf node is reached in step 380. If the leaf node indicates a further tree fragment, the algorithm is repeated from step 370. In a further embodiment, if the tree fragment contains another structure, such as a fragment header, the location of the data record is retrieved. In step 385, the data record is retrieved from memory. Generally, this will require a third access to main memory. This step can require more retrievals if multiple tree fragments were traversed.

In one embodiment, in step 390, the keys of the data record are compared against the search key. If the keys match the search, it is indicated to be successful, in step 390.

In one embodiment, each fragment of a fragmented tree has the same size. However, those skilled in the art will know that simple modifications will allow for individual sized tree fragments, for example, by indicating the size of the fragment in the later described fragment header.

Figure 4A:
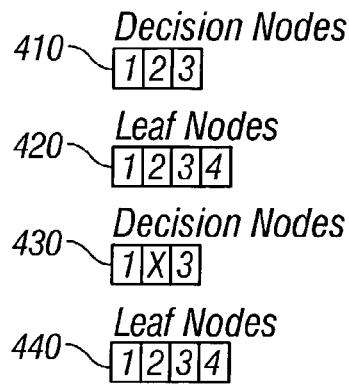
FIG. 4A illustrates a layout of a sub-tree fragment organized in memory.

In FIG. 4A, the tree fragment of FIG. 2 is stored in main memory. The binary tree fragment 220 has three decision nodes and four leaf nodes. The decision nodes are stored in main memory as a block (or array) 410. Using this layout, the address of the left and right descendant of a decision node can be determined from the base address of the tree fragment using simple algebraic expressions. In one embodiment, this makes it unnecessary to store pointers for the left and right descendants within each decision node, thus saving memory. In this embodiment, if decision node 2 was non-existent and there was a leaf node in the place of decision node 2, the space in the block 410 for decision node 2 would be empty and unused, as indicated in the array 430; that is, if decision nodes are non-existent, they still consume memory.

In FIG. 4A, the leaf nodes are not stored along with the decision nodes. Instead, when the search algorithm traverses the tree fragment and finally determines the proper leaf node, it determines the index number (here 1-4) of the leaf node, rather than its address in main memory. The leaf node can be either a tree fragment, which again needs to be traversed by the search algorithm, or the final route information. Leaf nodes of a tree are stored in main memory as a block 420 in consecutive memory locations in a similar manner to the decision nodes. In a further embodiment, block 420 can be an array. All leaf nodes are equal in size, but their size might be different from the size of a decision node. If a leaf node is non-existent, the corresponding place in the block (or array) 420 will not be empty and unused, but will be occupied by the next existing leaf node. In other words, there are no empty spaces in the block 420. From only knowing the index number of the leaf node (here 1-4), the algorithm needs to determine the address of the leaf node, as explained in FIG. 4B.

Figure 4B:
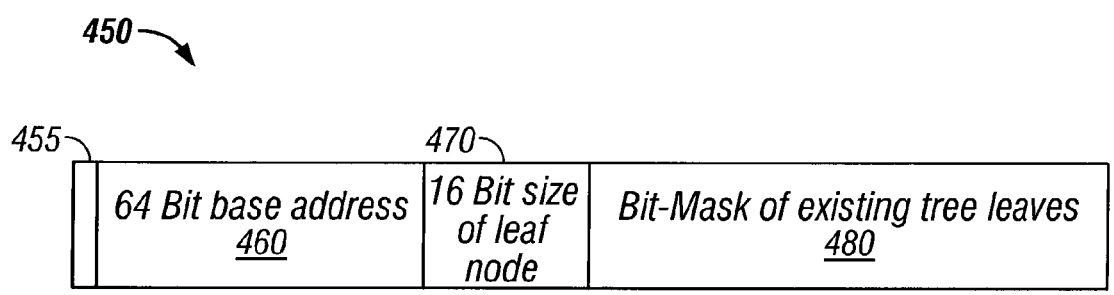
FIG. 4B illustrates headers for the application of sub-tree fragments to longest prefix matches (LPMs)

Turning now to FIG. 4B, illustrated is one embodiment of a tree fragment header 450. In the binary tree 200, each tree fragment 210, 220, 230, etc. is stored as a contiguous block in memory. Each tree fragment is also preceded by the tree fragment header 450. The tree fragment header 450 comprises a base address pointer 460, indicia of the size of a leaf node 470, and a bit mask of occupied tree leaves 480. Typically, the base address pointer 460 indicates the location of the first tree leaf of the sub-tree fragment in memory.

The leaf node 470 comprises the size in memory occupied by a tree leaf structure. In one embodiment, the size is a power of 2, and can be expressed as a binary number up to 16 significant digits. However, those skilled in the art understand that sizes other than those of a power of 2 are also within the scope of the present invention. The address, and therefore the location, of a tree leaf in memory, either in the main memory 120 or the local store 130, can be calculated by multiplying the leaf index with the leaf size and adding it to the base address.

The fragment header 450, as shown in FIG. 4B, is used for more efficient operations. Element 460 of the fragment header stores the base address of the leaf node block 420. Element 470 stores the size of a leaf node. Finally, element 480 contains a bit mask. The bit mask 480 indicates which of the leaf nodes of the tree fragment actually exist and which ones are non-existent. A bit in the bit mask corresponds to a possible leaf node, and will be set to '1' if the leaf node exists, or set to '0' if it does not. For instance, the tree fragment 210 with four leaf nodes will have a bit mask of length 4-Bit with all bits set to '1' since all leaf nodes are present. If, for example, leaf node 3 was non-existent, Bit 3 in the bit mask would be cleared (set to '0').

This fragment header allows for more efficient calculation of a leaf node address. If, for example, the search algorithm determines leaf node i to be the result, all bits in the bit mask, including and above i, would be cleared. Afterwards, the number of bits in the resulting bit mask is counted, for example, using a "count ones"-instruction, which can be found in many modern microprocessor architectures. This result is multiplied with the leaf node size 470 and then added to the base address 460 to obtain the address of the leaf node. Then, the leaf node is loaded from main memory to local store. In case it is another tree fragment, it would be traversed just like the tree fragment before.

In one embodiment, the single Bit 455 is employable as an optional element in the fragment header. Generally, a leaf node of a tree fragment can either be another tree fragment or a leaf node of the original, unfragmented tree (that is, routing information in the IP-example). The table entry 240 can point to either of these two types. The Bit 455 is located in the fragment header to be employable to distinguish between these two types. If the bit is set to '1', a fragment header including a tree fragment follows the Bit 455. If the bit is '0', no fragment header and no tree fragment follows the Bit 455, but instead the routing information can be found at these memory locations.

There are several degrees of freedom in how this header can be built. In one embodiment, if the leaf node size 470 is a power of two, the multiplication step in the leaf node address calculation would be realizable with a simple shift-operation. Then, however, the leaf node size does not need to be encoded with 16-Bit. Instead, fewer bits are sufficient if the possible leaf node sizes can be encoded with these bits. For example, if the leaf node size is either 1024 Bytes or 2048 Bytes, the field 470 need only be 1-Bit wide, since 1-Bit is sufficient to distinguish between two different sizes. Hence, the field 470 might be omitted if there is only one possible leaf node size.

In a second embodiment, the Bit 455 might be omitted and its purpose realized in another way. For example, in order to indicate routing information, the address 460 might be set to all zeros, or to another impossible value. Also, the type fields 515 resp. 535 (described below) can be used to distinguish the types of their children. However, when employing 515 resp. 535, a means needs to be found to distinguish the type of the object to which the table entry 240 points. This, however, might be realized with a Type-field (like 1-Bit) within the table entry 240.

Figure 5:
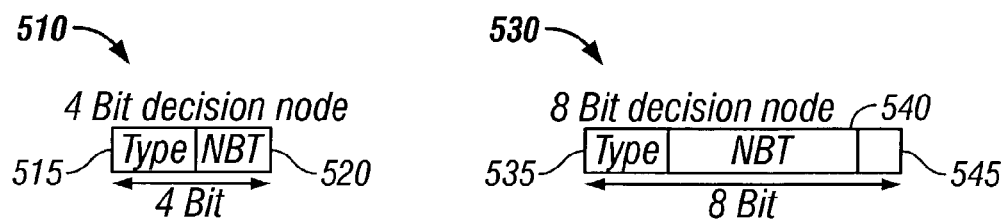
FIG. 5 illustrates an example of the format of a decision node.

Turning to FIG. 5, an example of the format of a decision node is illustrated. Two examples of decision nodes are shown, labelled 510 and 530, in the form of a 4-Bit node and an 8-Bit node. However, it is obvious that these are only examples and there are many possible formats for decision nodes. The 4-Bit node might be advantageous with IPv4, whereas the 8-Bit node might be better suitable for IPv6. Both nodes have in common a Type-field 515, 535 respectively, and an NBT-field 520, 540, respectively. The NBT-field indicates the "Next Bit to Test" and represents an offset to the next bit in the IP-Address to decide on in this decision node. Those skilled in the art will know how the NBT-field is used for LPM. The decision node 530 additionally has one unused Bit 545.

The Type-field allows encoding of four different types of decision node, but more or less types might be desirable for a particular application. The following four types seem to be advantageous for a given application:

00: Decision Node has two child nodes, which both itself are decision nodes.
01: Decision Node has two child nodes, the left of which is a decision node, the right is a leaf node.
10: Decision Node has two child nodes, the left of which is a leaf node, the right is a decision node.
11: Decision Node has two child nodes, both of which are leaf nodes.

Figure 6:
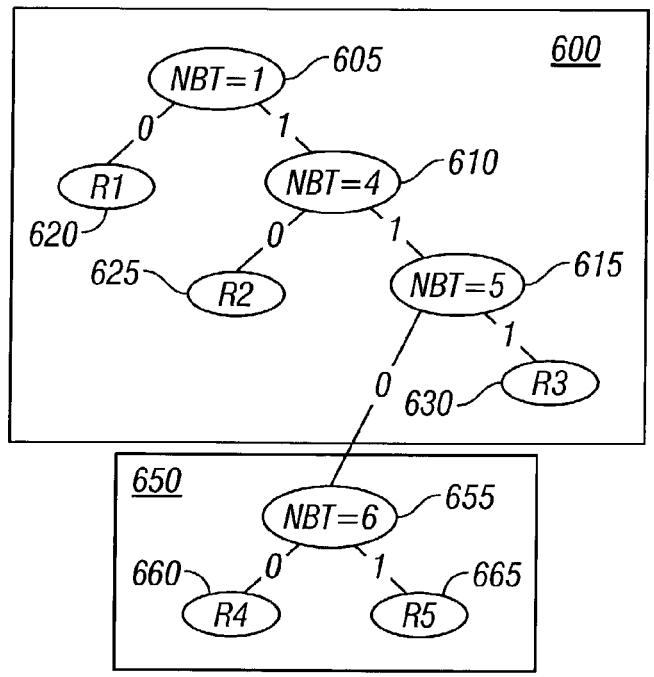
FIG. 6 illustrates a Patricia tree.

Turning now to FIG. 6, a tree search shall now be clarified with an example. This example is in no way limiting and describes only one possible way the invention might be applied.

In one embodiment, a set of IP-Address prefixes exist:

| 1. | 0010 | 0101 | 1100 | 1111 | 010  |    |
|----|------|------|------|------|------|----|
| 2. | 0010 | 0101 | 1100 | 1111 | 110  |    |
| 3. | 0010 | 0101 | 1100 | 1111 | 1101 | 1  |
| 4. | 0010 | 0101 | 1100 | 1111 | 1101 | 0  |
| 5. | 0010 | 0101 | 1100 | 1111 | 1101 | 01 |

All of these prefixes share the same first 16-Bit. A Patricia tree is created using the remaining 3- to 6-Bits of the prefixes, which will then be fragmented. A pointer to the root of the first fragment will be stored in the 65536 entry table at position 0010 0101 1100 $1111_2$=35CFH.

In FIG. 6, the route that an IP-packet with a destination address matching one of the prefixes takes will be labelled R1 through R5, corresponding to the prefixes 1 through 5. A Patricia tree is created from this set of prefixes. The Patricia tree is fragmented into two tree fragments 600 and 650. If the Patricia tree were a balanced binary tree, the fragments would have seven decision nodes and eight leaf nodes.

Figure 7:
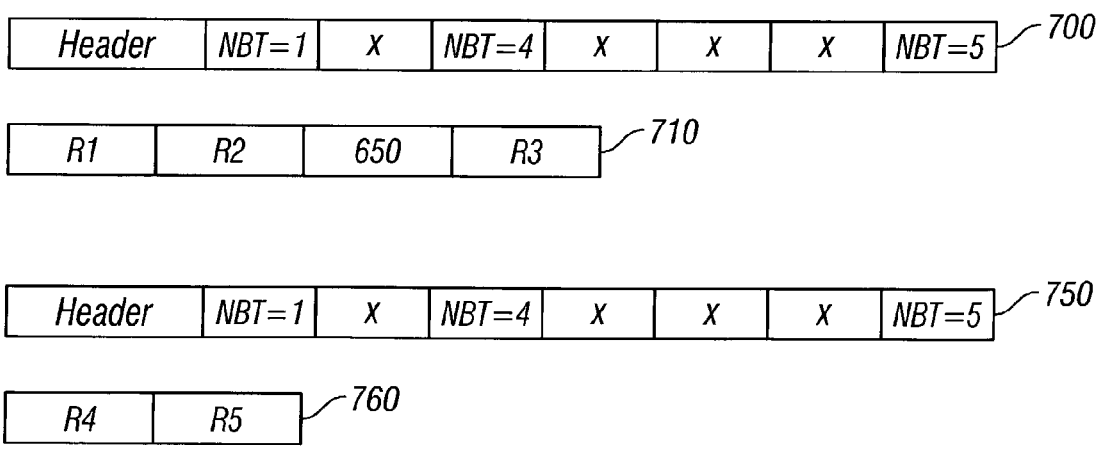
FIG. 7 illustrates an example of a layout of the tree fragments in memory.

Turning briefly to FIG. 7, the Patricia tree is a non-balanced binary tree, which leads to the layout of the decision nodes and leaf nodes. The decision nodes of tree fragment 600 are stored in main memory as the block 700. This block starts with the fragment header, followed by the decision nodes of the tree fragment 600. Memory was allocated for seven decision nodes, as a balanced binary tree would have seven decision nodes. The nodes missing in tree fragment 600, compared to a balanced binary tree, will remain empty and unused. The leaf nodes of the tree fragment 600 are stored in main memory as the block 710. In this block, the third stored leaf node is the tree fragment 650. The remaining leaf nodes are the route information R1 through R3. All these leaf nodes are equal in size. If necessary, padding bits or padding bytes need to be inserted to make them equal in size.

The decision nodes of the tree fragment 650 are stored as block 750 in main memory, its leaf nodes as the block 760. Both blocks are structured similar to the blocks 700 and 710.

Turning back to FIG. 6, the algorithm determines route information for an IP-packet with the destination address 0010 0101 1100 1111 1101 0100 1111 0000. In the illustrated embodiment, the first 16-Bit are used as a hash key to lookup the corresponding entry in the 65536 entry table. The memory block pointed to by this entry (or associated with this entry) is loaded from main memory and it is determined that the loaded memory block is a tree fragment. In the illustrated embodiment of FIG. 7, the loaded memory block is the previously described memory block 700.

The method of FIG. 3B, employing an algorithm, then traverses this tree fragment, testing bits 1, 4 and 5 from the remaining 16-Bits of the IP-Address. The system then loads the determined leaf node of the tree fragment from memory block 710, which comprises another tree fragment 650 in the form of the memory block 770. After testing bit 6 of the remaining 16-Bits of the destination IP-Address, the leaf node 665 is determined to be the proper tree fragment leaf node. This leaf node is loaded from the memory block 760. The algorithm of the system calculates that it is not a new tree fragment, but actual route information. Since only a subset of the IP-prefix bits were tested, the complete prefix has to be stored within this route information and tested against the IP-destination address of the IP-packet. If there is a match, the algorithm of the system has determined the correct route information and can then forward the packet. If there is no match, the method of FIG. 3B takes further action, such as searching for a prefix match shorter than 16-Bits in a separate Patricia tree dedicated to short prefixes.

It is understood that the present invention can take many forms and embodiments. Accordingly, several variations may be made in the foregoing without departing from the spirit or the scope of the invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modi- fications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method of initializing a data structure comprising a tree structure that employs a single hash table and a plurality of tree fragments, comprising:
creating the single hash table;
creating the plurality of tree fragments comprising a plurality of decision nodes and a plurality of leaf nodes of the tree structure, wherein each of the plurality of tree fragments is substantially the same size and comprises a header;
storing the plurality of tree fragments such that:
the plurality of decision nodes are stored in a contiguous block of memory in a relative position based on the position of the decision node in the tree structure, including blank positions; wherein storing the tree fragment is a function of a local storage size, wherein the local storage size is selected from the group consisting of a memory burst access size, a bus transfer size and a cache line size; and
the plurality of leaf nodes are stored in a contiguous block of memory based on the position of the leaf node in the tree structure, concatenating leaf nodes to eliminate blank positions;
hashing at least one table entry corresponding to each tree fragment, thereby creating at least one hash key and at least one hash table entry; and
assigning the tree fragment to at least one hash table entry.

2. The method of claim 1, wherein the hash table comprises a one-to-one hash table.

3. The method of claim 1, wherein each of the plurality of leaf nodes are substantially equal in size.

4. The method of claim 1, further comprising employing the data structure to perform a prefix search.

5. The method of claim 4, further comprising forwarding an Internet protocol packet through employment of the prefix search.

6. The method of claim 1, wherein a separate table is accessed when the tree fragment associated with the hash key has zero or one entries.

7. The method of claim 1, wherein the step of assigning a leaf node tree fragment further comprises assigning Internet protocol routing information to a leaf node of the sub-tree fragment.

8. The method of claim 1, further comprising a step of locating a leaf node within the tree fragment as a function of an associated memory address of the leaf node.

9. The method of claim 1, wherein the step of storing the tree fragment comprises substantially one loading sequence.

10. The method of claim 1, wherein the fragment header comprises a base address pointer, an indicia of the size of a decision node, and a bit mask indicating occupied leaf nodes.

11. The method of claim 1, wherein the tree fragments comprise Patricia tree fragments.

12. A computer program product for initializing a data structure comprising a tree structure that employs a single hash table and a plurality of tree fragments, the computer program product having a computer-readable medium with a computer program embodied thereon, the computer program comprising:

computer code for creating the single hash table;
computer code for creating the plurality tree fragments comprising a plurality of decision nodes and a plurality of leaf nodes of the tree structure, wherein each of the plurality of tree fragments is substantially the same size and comprises a header;
computer code for storing the plurality of tree fragments such that:
the plurality of decision nodes are stored in a contiguous block of memory in a relative position based on the position of the decision node in the tree structure, including blank positions; wherein storing the tree fragment is a function of a local storage size, wherein the local storage size is selected from the group consisting of a memory burst access size, a bus transfer size and a cache line size; and
the plurality of leaf nodes are stored in a contiguous block of memory based on he position of the leaf node in the tree structure, concatenating leaf nodes to eliminate blank positions;
computer code for hashing at least one table entry corresponding to each tree fragment, thereby creating at least one hash key and at least one hash table entry; and
computer code for assigning the tree fragment to at least one hash table entry.

13. The computer program product of claim 12, wherein the fragment header comprises a base address pointer, an indicia of the size of a decision node, and a bit mask indicating occupied leaf nodes.

14. The computer program product of claim 12, wherein the tree fragments comprise Patricia tree fragments.

15. A processor for initializing a data structure comprising a tree structure that employs a single hash table and a plurality of tree fragments, the processor including a computer program comprising:
computer program code for creating the single hash table;
computer program code for creating the plurality of tree fragments comprising a plurality of decision nodes and a plurality of leaf nodes of the tree structure, wherein each of the plurality of tree fragments is substantially the same size and comprises a header;
computer program code for storing the plurality of tree fragments such that:
the plurality of decision nodes are stored in a contiguous block of memory in a relative position based on the position of the decision node in the tree structure, including blank positions; wherein storing the tree fragment is a function of a local storage size, wherein the local storage size is selected from the group consisting of a memory burst access size, a bus transfer size and a cache line size; and
the plurality of leaf nodes are stored in a contiguous block of memory based on the position of the leaf node in the tree structure, concatenating leaf nodes to eliminate blank positions;
computer program code for hashing at least one table entry corresponding to each tree fragment, thereby creating at least one hash key and at least one hash table entry; and
computer program code for assigning the tree fragment to at least one hash table entry.

16. The processor of claim 15, wherein the fragment header comprises a base address pointer, an indicia of the size of a decision node, and a bit mask indicating occupied leaf nodes.

17. The processor of claim 15, wherein the tree fragments comprise Patricia tree fragments.

* * * * *